Aug. 9, 1960 J. E. GILLMORE, SR 2,948,454
HORIZONTAL COMPARTMENTALIZED NURSERY BOX
Filed March 21, 1958 2 Sheets-Sheet 1
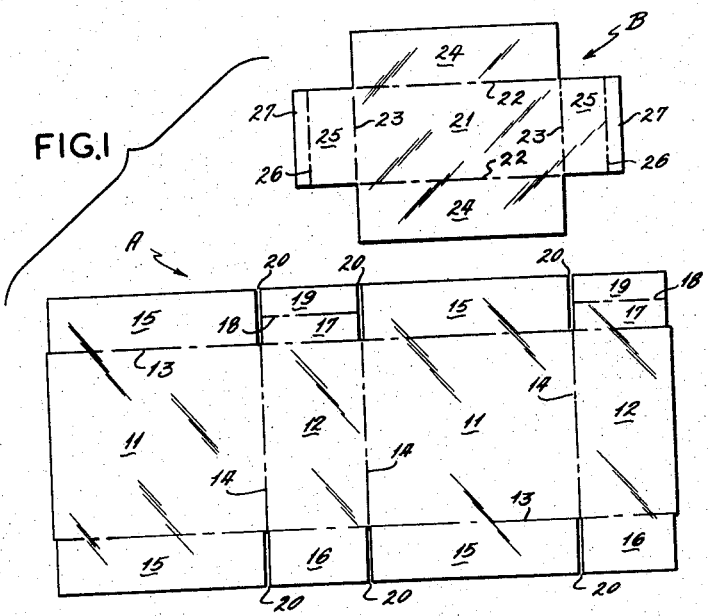
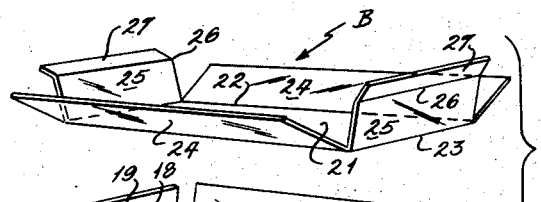
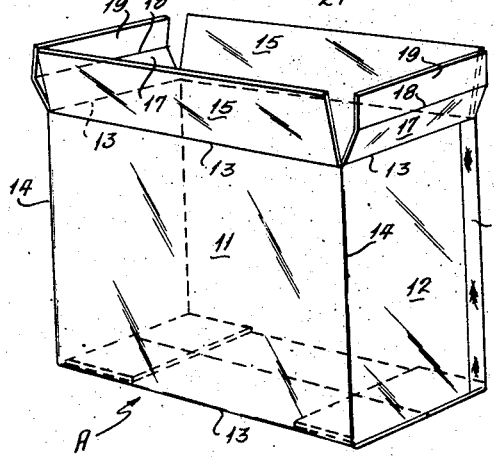
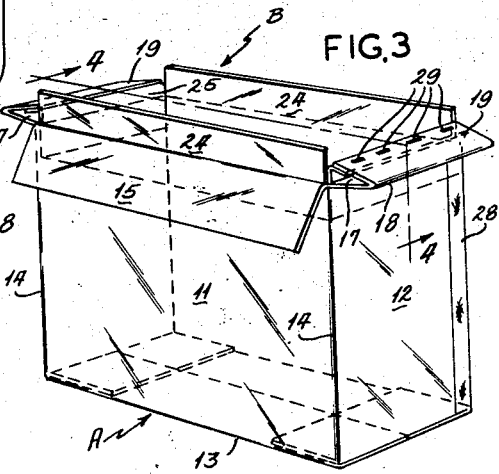
INVENTOR:
JOHN E. GILLMORE SR.
By
ATTORNEY.

Aug. 9, 1960 J. E. GILLMORE, SR 2,948,454
HORIZONTAL COMPARTMENTALIZED NURSERY BOX
Filed March 21, 1958 2 Sheets-Sheet 2
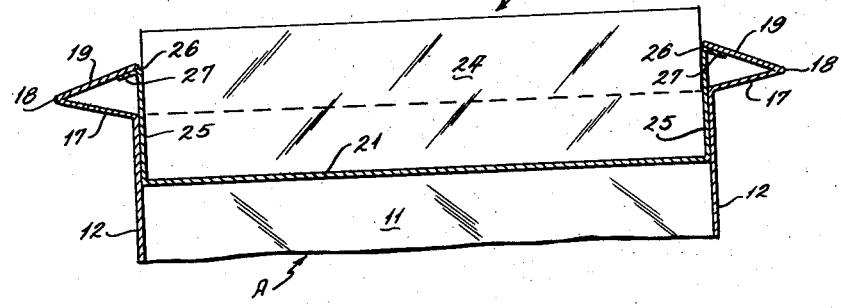
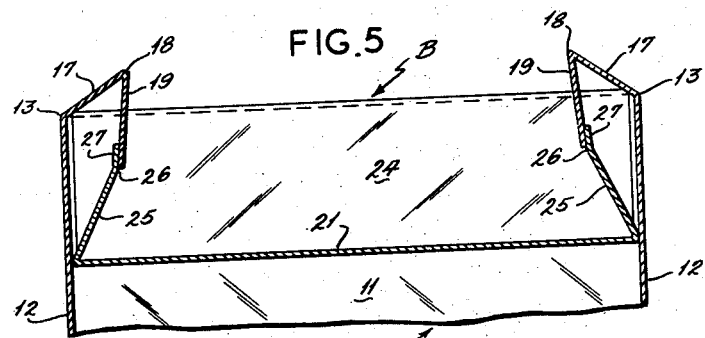
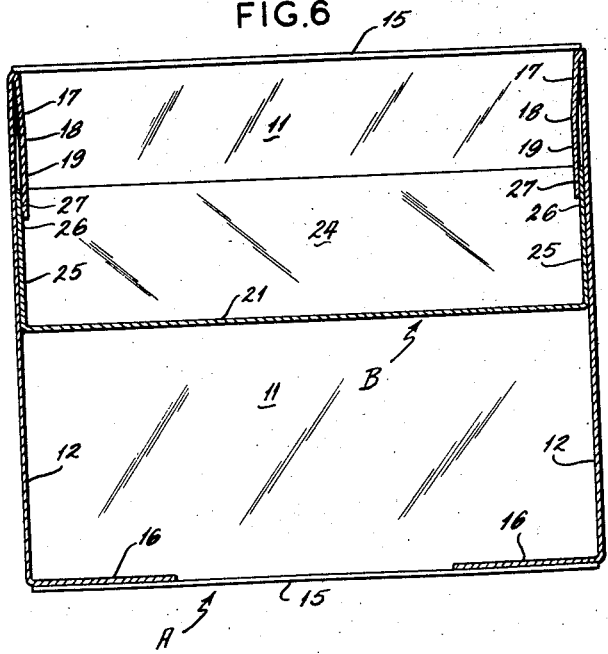
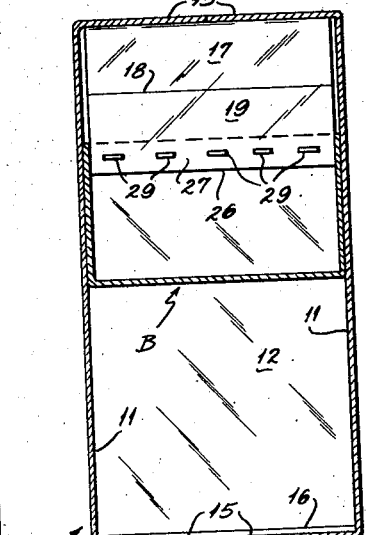
INVENTOR:
JOHN E. GILLMORE SR.
By William Fye
ATTORNEY

United States Patent Office 2,948,454
Patented Aug. 9, 1960

2,948,454

HORIZONTAL COMPARTMENTALIZED NURSERY BOX

John E. Gillmore, Sr., Tampa, Fla., assignor to Crown Zellerbach Corporation, San Francisco, Calif., a corporation of Nevada Filed Mar. 21, 1958, Ser. No. 722,961

3 Claims. (Cl. 229—23)

This invention relates to containers for packing and shipping cut or potted flowers and potted plants from southern growing areas to the northern markets. The containers employing this invention may be constructed of solid fiberboard, corrugated fiberboard, or any other suitable material.

My invention is directed to containers for relatively large quantities of potted flowers and plants weighing up to approximately one hundred (100) pounds. The container embodied by my invention may often range in size up to approximately 30" x 18" x 40". Potted flowers and plants require adequate room for foliage and, therefore, tall containers of relative large volume are required to ship merchandise of the type described.

Consequently, I have designed a relatively tall container which is horizontally compartmentalized into two compartments, which affords the placing of potted flowers or plants in the bottom portion then suspending a tray horizontally at substantially midway the height of the container and loading another layer of potted flowers or plants on the suspended tray, thereby substantially reducing the cross-sectional storing or shipping area required for potted flowers and plants. Containers employing the subject invention may be substantially preassembled and shipped partially knocked down to the user, which results in substantial economies.

More specifically, the containers comprise a body member and a suspended tray member. The body member has four connected together side and end walls, complete with bottom closure flaps, and with suspending flaps integral with the upper portions of the end walls, and with top closure flaps integral with the upper portions of the side walls. The suspended tray member has a flat bottom panel with upstanding integral side and end wall panels, each end wall panel having a flap integral and co-extensive with its outer portion.

In the assembly of the container, the bottom flaps are folded right angularly inwardly and secured together in any desired manner, and a layer of potted flowers or plants placed in the bottom thereof. The integral flaps on the outer portion of the tray member end walls are stapled to the outer suspending flaps integral with the end walls of the body member, and the tray member is thus inserted through the top of the container until its bottom panel is suspended horizontally substantially midway the height of the body member by the co-action of the outer flaps of the tray end walls and the suspending flaps on the upper portion of each end wall of the body member.

An object of this invention is to provide an inexpensive and lightweight container suitable for packing and shipping relatively large quantities of cut and potted flowers and potted plants.

A further object is to provide a container with a horizontally divided interior suitable for packing two layers of potted flowers and plants for shipment, thereby conserving space by utilizing one relatively tall container. These and other objects and advantages of the invention will be apparent to those skilled in the art upon a full and complete understanding of the construction and operation of the device as hereinafter set forth.

The invention consists in the parts, arrangement and combination of parts, hereinafter described and claimed. The accompanying drawings form a part of this specification and like numerals and symbols therein appearing refer to like parts wherever they occur.

In the drawings:

Fig. 1 is a plan view of the component parts of a container embodying the preferred form of the invention;

Fig. 2 is a perspective view of the body member partially assembled and the tray member preparatory to securing and inserting into the body member;

Fig. 3 is a perspective view showing the tray member outer suspending flaps secured to the body member upper end wall suspending flaps;

Fig. 4 is a sectional view taken in the drection of the arrows 4—4 in Fig. 3;

Fig. 5 is a sectional view showing the tray member preparatory to being completely suspended into the body member;

Fig. 6 is a sectional view showing the tray member completely suspended within the body member; and Fig. 7 is a sectional view showing the end portion of the container in a fully assembled condition.

The body member A shown in Fig. 1 is provided with opposed pairs of connected together side and end wall panels 11 and 12, respectively, defined by vertical scores 14 and two horizontal scores 13, which also define top and bottom side wall closure flaps 15 and bottom end wall closure flaps 16 as well as top end wall suspending flaps 17. Horizontal scores 18 define outer suspending flaps 19 integral and co-extensive in width with said suspending flaps 17. Slots 20 also define in part the side and end wall bottom closure flaps 15 and 16 and the side wall top closure flaps 15 and top end wall suspending flaps 17 and outer suspending flaps 19.

The tray member B shown in Fig. 1 is provided with a flat bottom panel 21 defined by vertical scores 23 and horizontal scores 22 which also define the inner edge portions of the upstanding side walls 24. The score lines 23 also define the inner edge portions of inner tray member suspending flaps 25; the inner edges of the outer integral suspending flaps 27 of each upstanding end wall 25 are defined by the vertical scores 26.

A preferred method of erecting the body member is to affix a tape 28 to the outside of the two free edges of the side and end wall panels 11 and 12, folding the bottom closure flaps 15 and 16 right angularly inwardly and securing them together in any desired manner. As best shown in Fig. 3, an outer suspending flap 27 on the tray member B is stapled to the outer suspending flap 19 on each end wall of the body member forming a multiple hinged outward extension of flaps 17, 19 and 25 foldable about score lines 13, 18, 26 and 23, permitting the tray member B to be positioned downwardly into the interior of the body member A and suspended horizontally therein by the co-action of the aforementioned suspending flaps.

The position of the tray panel 21 relative to the height of the body member is determined by the cumulative width of the flaps forming said multiple hinged outward extension. The top closure flaps 15 on the body member A may then be folded right angularly inwardly, completing the assembly of the container.

It is to be understood that the embodiments herein described are illustrative and not restrictive, and that all such modifications which are similar or equivalent hereto come equally within the scope of the claims next appearing.

I claim:
1. A relatively tall paperboard container comprising a body member and an interiorly suspended tray member, said body member having opposed pairs of connected together side and end walls complete with bottom closure flaps, each side wall having an integral top closure flap, an inner body member suspending flap integral with the top edge of each end wall with an outer body member suspending flap integral and co-extensive in width therewith, said tray member having a flat bottom panel with integral side flaps, integral with each end of the said tray bottom panel, an inner tray member suspending flap with an outer tray member suspending flap integral and co-extensive in width therewith, means for suspending the tray bottom panel horizontally intermediate the height of the body member, said means comprising securing together the outer body and tray member suspending flaps in flatwise juxtaposed relation, thereby forming with the inner body and tray member suspending flaps, a multiple hinged extension for suspending the tray bottom panel into the body member.

2. A relatively tall paperboard container comprising a body member and an interiorly suspended tray member, said body member having opposed pairs of connected together side and end walls complete with bottom closure flaps, each side wall having an integral top closure flap, an inner body member suspending flap integral with the top edge of each end wall with an outer body member suspending flap integral and co-extensive in width therewith, said tray member having a flat bottom panel with integral side flaps, integral with each end of the said tray bottom panel, an inner tray member suspending flap with an outer tray member suspending flap integral and co-extensive in width therewith, the outer body and tray members suspending flaps being secured together in juxtaposed relation and with the inner body and tray member suspending flaps, positioned substantially flatwise against the inner face of the upper margins of the end walls.

3. A container comprising a body member with foldably connected top and bottom closure flaps and an interiorly suspended tray member, said body member having opposing pairs of foldably connected side walls, a first pair of body side walls having body member suspending flaps foldably connected and substantially co-extensive in width with the top margins thereof, outer body member suspending flaps foldably connected and generally coextensive in width to said body member suspending flaps, the tray member having a flat bottom panel substantially coextensive to a transverse section intervening the side walls of the body member, the flat bottom panel having a pair of opposing side margins disposed adjacent to the said one pair of body side walls and having inner tray member suspending flaps foldably connected to said side margins and having outer edges defined by score lines with outer tray member suspending flaps foldably attached thereby, said tray member suspending flaps substantially coextensive in width to said flat bottom panel pair of opposing side margins, the tray bottom panel having other sides with side flaps integrally connected and substantially coextensive therewith, the outer tray member suspending flaps secured in flatwise contacting relation to the outer body member suspending flap thereby forming a multiple hinged extension for suspending the tray bottom panel into the body member with the inner body and tray member suspending flaps positioned substantially flatwise against the inner face of the upper margins of the body member first pair of side walls, the multiple hinged extension comprising the body member suspending flap, the outer body member suspending flap and the inner tray member suspending flap being so related in legnth that the body member suspending flap is equal to or less than the combined length of the outer body member suspending flap and the inner tray member suspending flap, and the outer body member suspending flap is equal to or less than the combined length of the body member suspending flap and the inner tray member suspending flap.

References Cited in the file of this patent

UNITED STATES PATENTS

| | | |
|---|---|---|
| 1,940,848 | Davidson | Dec. 26, 1933 |
| 2,095,798 | Davidson | Oct. 12, 1937 |

FOREIGN PATENTS

| | | |
|---|---|---|
| 100,014 | Australia | Jan. 6, 1937 |